(12) United States Patent
King

(10) Patent No.: US 10,080,345 B2
(45) Date of Patent: Sep. 25, 2018

(54) CLEANING OF ANIMAL BODY PARTS

(71) Applicant: GENUS PLC, Basingstoke, Hampshire (GB)

(72) Inventor: Andrew King, Basingstoke (GB)

(73) Assignee: GENUS PLC, Basingstoke (GB)

( * ) Notice: Subject to any disclaimer, the term of this patent is extended or adjusted under 35 U.S.C. 154(b) by 59 days.

(21) Appl. No.: 14/759,274

(22) PCT Filed: Dec. 18, 2013

(86) PCT No.: PCT/GB2013/053333
§ 371 (c)(1),
(2) Date: Jul. 6, 2015

(87) PCT Pub. No.: WO2014/106731
PCT Pub. Date: Jul. 10, 2014

(65) Prior Publication Data
US 2015/0351366 A1 Dec. 10, 2015

(30) Foreign Application Priority Data
Jan. 3, 2013 (GB) .................... 1300065.8

(51) Int. Cl.
*A01K 13/00* (2006.01)
*A01J 7/04* (2006.01)

(52) U.S. Cl.
CPC ............... *A01K 13/001* (2013.01); *A01J 7/04* (2013.01)

(58) Field of Classification Search
CPC ........ A01K 13/003; A01K 13/001; A01J 7/04
USPC ..... 119/14.18, 651, 650, 652, 665, 670, 603
See application file for complete search history.

(56) References Cited

U.S. PATENT DOCUMENTS

| | | | | |
|---|---|---|---|---|
| 2003/0070621 | A1* | 4/2003 | Dalh | A01J 7/04 119/14.47 |
| 2005/0229349 | A1* | 10/2005 | Foser | A01K 13/001 15/227 |
| 2007/0283516 | A1* | 12/2007 | Rasmussen | A01K 13/001 15/160 |
| 2008/0041319 | A1* | 2/2008 | Rasmussen | A01K 13/001 119/603 |
| 2009/0078208 | A1 | 3/2009 | Hakes et al. | |
| 2010/0307534 | A1* | 12/2010 | Veenstra | B01F 1/0027 134/18 |
| 2012/0174872 | A1* | 7/2012 | Richards | A01L 15/00 119/665 |
| 2014/0060449 | A1* | 3/2014 | Dole | A01J 7/04 119/652 |

FOREIGN PATENT DOCUMENTS

| | | |
|---|---|---|
| EP | 1352950 A2 | 10/2003 |
| GB | 2163947 A | 3/1986 |
| WO | 2007/122593 A2 | 11/2007 |

OTHER PUBLICATIONS

Apr. 1, 2014 International Search Report issued in International Application No. PCT/GB2013/053333.
Apr. 1, 2014 Written Opinion issued in International Application No. PCT/GB2013/053333.
May 29, 2018 Office Action issued in European Application No. 13 826 577.2.

* cited by examiner

*Primary Examiner* — Trinh T Nguyen
(74) *Attorney, Agent, or Firm* — Oliff PLC

(57) ABSTRACT

A method of disinfecting or cleaning a body part of an animal including the steps of: impregnating a web of material with a disinfectant liquid and capable of generating a foam; causing the liquid within the web to foam; applying foaming liquid to the body part with the web including wiping the animal body part with the impregnated web; allowing the foaming liquid thus applied to the body part to evaporate from the body part.

16 Claims, No Drawings

CLEANING OF ANIMAL BODY PARTS

BACKGROUND TO THE INVENTION

1. Field of the Invention

The present invention relates to the cleaning of animal body parts. One example is the teats of a cow's udders, which require cleaning and disinfecting prior to milking to ensure that no harmful bacteria or organic material then finds its way into the milk.

2. Description of Related Art

It is known to clean the teats of a cow's udder prior to milking by applying a foaming solution of disinfectant and surfactant to each teat. The foaming solution (one example being the foaming disinfectant solution sold by the applicant under the trade mark 'Valiant Foam Active') is applied in a teat-shaped cup which is then placed over the teat for a short period allowing the entire teat to be covered in the foam. The foaming solution is then left on the teat for a period of time, typically in the region of a minute or two, and then wiped off using a disposable wipe. This process, though effective, is time consuming in that it requires two separate steps separated by an interval of time. That time penalty is multiplied by the number of teats which are to be disinfected so that, when a large herd of cows is to be milked, the time required is substantial.

SUMMARY OF THE INVENTION

The present invention provides an alternative method. It has been found, contrary to the prior understanding, that a satisfactory disinfecting action can be attained with a considerably shorter contact time between the teat and the foaming solution. In addition, it has also been found that it is not necessary to dry the teat after applying the foaming solution to it.

A first aspect of the present invention provides a method of disinfecting or cleaning a body part of an animal comprising the steps of: impregnating a web of material with a disinfectant liquid and capable of generating a foam; causing the liquid within the web to foam; applying foaming liquid to the body part with the web including wiping the animal body part with the impregnated web; allowing the foaming liquid thus applied to the body part to evaporate from the body part.

DESCRIPTION OF PREFERRED EMBODIMENTS

Embodiments of the invention will now be described, by way of examples.

According to a first embodiment of the present invention, a liquid foaming solution of disinfectant is prepared by combining a base material, containing a combination of a first reagent and a surfactant with an additive liquid containing a second reagent. The first and second reagents react with each other to create a foaming liquid having disinfectant properties. In the present embodiment, the base liquid preferably comprises between 5 and 10% of a surfactant in the form of a propylene glycol, between 1 and 5% of first reagent in the form of lactic acid, together with between 5 and 10% of glycerine which acts both as a humectant in the foaming liquid and also provides lubrication. The additive liquid, containing a second reagent, is, in the present embodiment, a solution of sodium chloride.

In the present specification the term foaming liquid is intended to be interpreted widely to encompass both a liquid which, by agitation or other mechanical action, is capable of being transformed into a foam, as well as a liquid which has the form of a foam. In the present embodiment, the two reagents react with each other to create chlorine dioxide. Chlorine dioxide is present in gaseous form within the liquid and is therefore physically dissolved within the liquid in a manner analogous to that in which, for example, oxygen gas is present within water. Preferably, the vessel used to mix the base and further liquid is also shaken vigorously to promote the generation of chlorine dioxide. One example of foaming liquid is the product sold by the applicant Genus under the trade mark 'Valiant Foam Active'.

A web of material is then inserted into the activated liquid foam. The material preferably comprises a plurality of layers which therefore assists with the retention of foaming liquid between the layers and, thereby assists the ability of the web to generate foam by the manipulation of the web by a user. This manipulating action effectively acts in a manner analogous to the extrusion of the liquid through a fine nozzle, i.e. acts to force air into the liquid which then results in a plurality of bubbles by which the foam is constituted. Thus, any suitable web of material which is capable of performing this action upon, say, squeezing of the web will suffice. According to one embodiment the web is made of a plurality of cotton layers. In an alternative embodiment the web comprises a mixture of 85% polypropylene and 15% viscose. In the present embodiment, the web has the form of a roll, with frangible sections so that individual 'wipes' can be torn off from the roll and used individually.

In a preferred embodiment, a roll of webbed material is inserted into the vessel. Preferably, the vessel is provided with a lid or suitable cover containing an aperture through which the free end of the roll then protrudes. This facilitates the removal of individual web sections from the roll by breaking a section off (by means of the frangible parts of the roll) to create a single, disposable 'wipe' impregnated with foaming liquid, while the remainder of the roll remains immersed in the foaming liquid. One embodiment provides a roll of web material having 800 sheets each of 200 mm by 230 mm in area and the web has a density of 20 to 55 grams per square meter of web material.

Preferably, each sheet of web material will contain between 2 and 6 ml of foaming liquid, which therefore equates to approximately 40 and 130 ml of foaming fluid per square meter of fabric and therefore between approximately 0.75 ml and 6.5 ml per gram of fabric. A preferred embodiment of the invention provides a sheet of 200 mm by 230 mm having a density of 35 grams per square meter containing around 4 ml of foaming fluid.

The web of sheets is then ready for use after approximately ten minutes following activation of the foaming liquid (by combination of the base and further liquid followed by agitation), this being a suitable time period within which to allow the foaming liquid to penetrate the roll of the web. Upon extraction of a sheet from the container, it is preferably squeezed in order to activate the foaming action of the liquid with which it is saturated by the action of forcing air into the liquid to create the bubbles of which the foam is comprised. The sheet web is then used vigorously to wipe the teats of the udder of a single cow (separate individual webs are therefore preferably used for different cows).

The cleansing of the teat occurs firstly by the foaming action of the liquid which traps chlorine dioxide gas in a small contained space adjacent the skin of the teat, thereby allowing a greater contact time between the disinfecting, anti-bacterial chlorine dioxide gas and the skin of the teat than would otherwise (i.e. in the absence of a foam) be the case. After the wiping is finished, the remaining foaming liquid is left on the teat to evaporate. This is in contrast to the prior art cleansing method in which the teat is then wiped dry after a large quantity of foam has been applied to the surface of the teat using a suitable cup. An aspect of an embodiment of the present invention is therefore the appreciation that the use of a smaller quantity of foaming liquid, applied by a wiping action, and then left to evaporate (while therefore retaining a longer contact time with the skin) provides a suitable and efficacious anti-bacterial action.

Further cleaning of the teat surface is provided by the surfactant within the foaming liquid, which serves to assist in the disinfectant action and also in the removal of organic matter from the surface of the teat, while the glycerine acts as a lubricant to prevent chaffing or damage to the teat. It is also thought that any residual, unreacted lactic acid present will also have some anti-bacterial action.

In alternative embodiments of the present invention alternative foaming liquids may be employed to cleanse a teat. For example, a disinfectant based on chlorhexidine and biguanide which combine to produce a rapid acting germicide may be used and benefit from the advantages of the present invention. According to a further embodiment, an antibacterial foaming liquid can be created using a liquid containing lactic acid glycerine, whereby the lactic acid is the primary anti-bacterial agent; one example of such a foaming liquid is sold by Ecolab Ltd under the trade mark OxyFoam D.

The invention claimed is:

1. A method of disinfecting or cleaning a body part of an animal comprising the steps of:
    impregnating a web of material with a disinfectant liquid and capable of generating a foam, wherein the web of material has the form of a roll with frangible sections;
    causing the liquid within the web to foam;
    applying foaming liquid to the body part with the web including wiping the animal body part with the impregnated web; and
    allowing the foaming liquid thus applied to the body part to evaporate from the body part.

2. The method according to claim 1, wherein the step of wiping the animal body part includes the step of mechanically removing organic matter from the body part using the web.

3. The method according to claim 1, wherein the step of causing the liquid to foam comprises the step of manipulating the impregnated web.

4. The method according to claim 3, wherein manipulation of the impregnated web has the action of forcing air through the liquid thereby creating bubbles.

5. The method according to claim 1, further comprising the step of preparing the liquid by adding a base material containing a surfactant and a reactant with a further reagent liquid containing a further reactant thereby to create the foaming liquid.

6. The method according to claim 5, further comprising the step of agitating a vessel containing the base material and the further reagent liquid.

7. The method according to claim 1, wherein the step of impregnating the web includes the step of immersing the web in the liquid disinfectant.

8. The method according to claim 1, wherein the web has a weight per square meter of between 20 and 55 grams per square meter.

9. The method according to claim 8, wherein each web is impregnated with between 20 ml and 60 ml of foaming liquid per square meter of web.

10. The method according to claim 1, wherein the foaming liquid contains chlorine dioxide gas.

11. The method according to claim 5, wherein the base material contains lactic acid as the reactant and the surfactant.

12. The method according to claim 11, wherein the surfactant is propylene glycol.

13. The method according to claim 11, wherein the further reactant is sodium chloride.

14. The method according to claim 1, wherein the foaming liquid comprises chlorhexidine and biguanide.

15. The method according to claim 1, wherein the foaming liquid comprises lactic acid as the primary anti-bacterial agent, and glycerine.

16. The method according to claim 1, wherein the animal is a cow and the body part includes the teats of a cow's udders.

* * * * *